(12) United States Patent
Zeng et al.

(10) Patent No.: US 11,611,813 B2
(45) Date of Patent: Mar. 21, 2023

(54) METHOD OF REMOVING FIXED PATTERN NOISE

(71) Applicants: SHANGHAI IC R&D CENTER CO., LTD., Shanghai (CN); CHENGDU IMAGE DESIGN TECHNOLOGY CO. LTD., Chengdu (CN)

(72) Inventors: Xi Zeng, Shanghai (CN); Pu Zhou, Shanghai (CN); Huijie Yan, Shanghai (CN); Ying Luo, Shanghai (CN); Xuehong He, Shanghai (CN); Yuan Zhang, Shanghai (CN); Hailing Yang, Shanghai (CN); Xiameng Lian, Shanghai (CN)

(73) Assignee: SHANGHAI IC R&D CENTER CO., LTD, Shanghai (CN)

( * ) Notice: Subject to any disclaimer, the term of this patent is extended or adjusted under 35 U.S.C. 154(b) by 0 days.

(21) Appl. No.: 17/760,767

(22) PCT Filed: Jul. 23, 2020

(86) PCT No.: PCT/CN2020/103762
§ 371 (c)(1),
(2) Date: Mar. 16, 2022

(87) PCT Pub. No.: WO2021/051999
PCT Pub. Date: Mar. 25, 2021

(65) Prior Publication Data
US 2022/0345650 A1 Oct. 27, 2022

(30) Foreign Application Priority Data

Sep. 16, 2019 (CN) .......................... 201910871007.3
Sep. 16, 2019 (CN) .......................... 201910871176.7

(51) Int. Cl.
H04N 25/65 (2023.01)
H04N 25/67 (2023.01)
H04N 25/778 (2023.01)

(52) U.S. Cl.
CPC ............ *H04N 25/65* (2023.01); *H04N 25/67* (2023.01); *H04N 25/778* (2023.01)

(58) Field of Classification Search
CPC ...... H04N 25/65; H04N 25/67; H04N 25/778; H04N 25/616; H04N 25/677; H04N 25/622
See application file for complete search history.

(56) References Cited

U.S. PATENT DOCUMENTS 7,045,753 B1 * 5/2006 Fox .................. H04N 25/77
348/308
10,250,832 B1 * 4/2019 Xu .................. H04N 25/778
(Continued)

FOREIGN PATENT DOCUMENTS

CN 108419033 B * 11/2020 ............. H04N 5/355

*Primary Examiner* — Nhan T Tran
(74) *Attorney, Agent, or Firm* — Tianchen LLC.; Yuan R. Li; Yi Fan Yin (57) ABSTRACT

A method of removing fixed pattern noise, comprising: S01: performing a single-frame segmented exposure on a pixel array; S02: reading a of the pixel array, comprising: S021: performing a soft reset, so as to set the reset signal of the pixel unit to an intermediate voltage, and reading a differential reset signal; S022: performing a hard reset so as to set the reset signal of the pixel unit to a high voltage; S023: turning on a transmission MOS transistor to enable an exposure signal of to photodiode to transmitted to the floating diffusion area, and reading a differential pixel transmission signal; S03: subtracting the differential reset signal from the differential pixel transmission signal to obtain an exposure signal with fixed pattern noise removed. Another (Continued)

method is removing fixed pattern noise and an image sensor are further provided.

17 Claims, 7 Drawing Sheets

(56) References Cited

U.S. PATENT DOCUMENTS

| | | | |
|---|---|---|---|
| 2004/0135064 A1* | 7/2004 | Mabuchi | H04N 25/575 348/E3.018 |
| 2009/0147119 A1* | 6/2009 | Kamiyama | H01L 27/14643 348/308 |
| 2019/0068905 A1* | 2/2019 | Suzuki | H04N 25/76 |

* cited by examiner

FIG.1

==Prior Art==

FIG.2

==Prior Art==

FIG.3

==Prior Art==

═Prior Art═

FIG.12

==Prior Art==

FIG.13

==Prior Art==

METHOD OF REMOVING FIXED PATTERN NOISE

CROSS-REFERENCE TO RELATED APPLICATION

The present disclosure is US national phase of a PCT application under PCT/CN2020/103762, which claims the priority of Chinese patent applications under CN201910871007.3 and CN201910871176.7 filed on Sep. 16, 2019. The contents of the aforementioned applications are incorporated herein by reference in their entirety.

TECHNICAL FIELD

The present disclosure relates to the field of image sensors, in particular to a method of removing fixed pattern noise.

BACKGROUND

CMOS image sensors (CISs) are widely used in daily life and processes due to their advantages of high integration, low power consumption, and low cost. Both high dynamic range and high frame rate are important specs of CISs. At present, the common methods to improve the dynamic range are mainly multi-exposure fusion (MEF), different conversion gains and segmented exposure. Multi-exposure fusion sacrifices the frame rate; the method of gain conversion will also halve the frame rate. Multi-exposure fusion and different conversion gains require additional algorithm processing on image signal processor (ISP). Through the method of single-frame segmented exposure, all signals can be read from just one frame, and high dynamic range is achieved without sacrificing the frame rate.

However, there is an inflection point difference in a spectral sensitivity curve obtained through High-Dynamic Range (HDR) single-frame segmented exposure, which makes fixed pattern noise (FPN) of the image increase. In techniques known to the inventors, each row is pre-exposed and a reference output signal including an inflection point difference is collected, such that the inflection point difference of output signals from each row is eliminated. But this method of eliminating the FPN doubles processing time for each line and reduces the frame rate of the image sensor.

Figure 11:
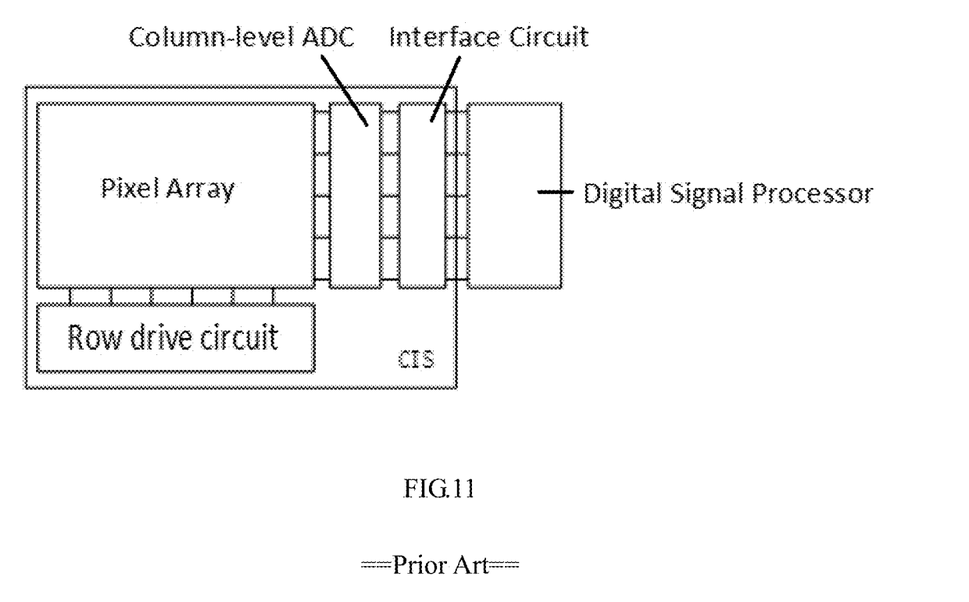
FIG. 11 shows a schematic diagram of a conventional image sensor frame.
Figure 12:
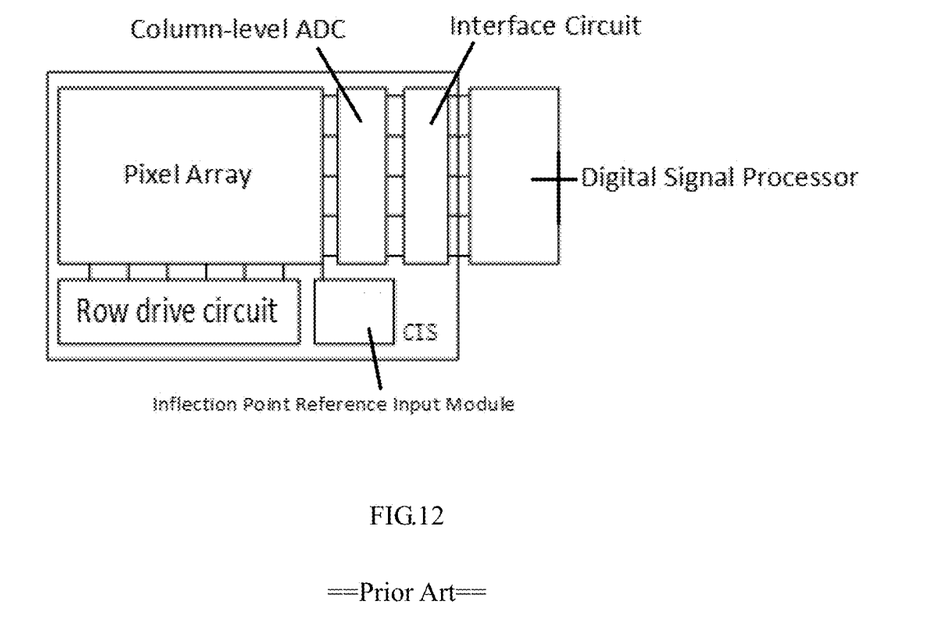
FIG. 12 shows a schematic diagram of a framework for optimizing a HDR single-frame FPN based on full well control in conventional arts.
Figure 13:
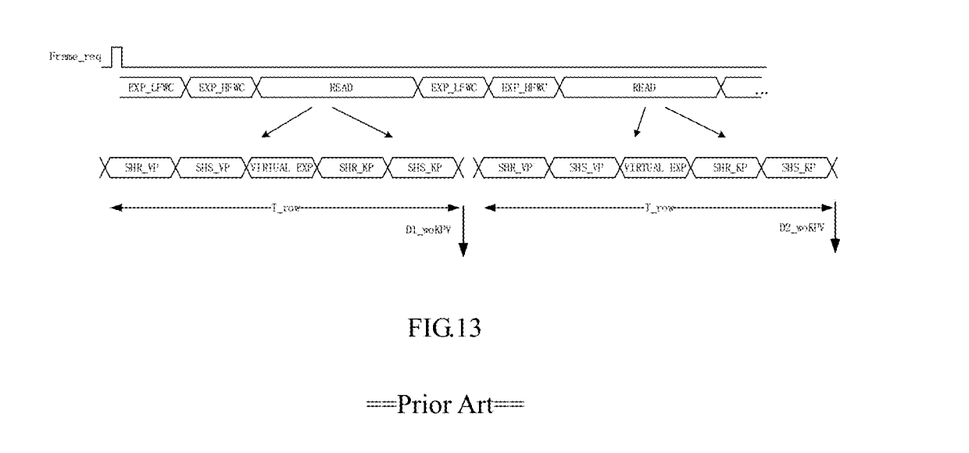
FIG. 13 is a schematic diagram showing a working process of optimizing a HDR single-frame FPN based on full well control in conventional arts.

As shown in FIG. 11, which illustrates a schematic diagram of a conventional image sensor, an image sensor module is mainly composed of a pixel array, a row drive circuit, a column-level ADC, and an interface circuit. The interface circuit is configured as an output port of the image sensor to output signals from the image sensor to a digital signal processor. Patent U.S. Ser. No. 10/250,832 B1 disclosed an optimization structure for HDR single-frame FPN based on full well control. As shown in FIG. 12, compared with the conventional image sensor shown in FIG. 11, an inflection point reference input module which is connected with a pixel array is introduced in FIG. 12. FIG. 13 illustrates a schematic diagram of the working process of the inflection point difference elimination scheme in a corresponding structure of FIG. 12. The working mode in FIG. 13 includes five processes when reading pixel signals from each row: reading a pixel reset signal SHR_VP, reading a pixel exposure signal SHS_VP, reading a pseudo exposure data VIRTUAL EXP (inflection point reference signal input), reading an inflection point reset signal SHR_RP and reading an inflection point output signal SHS_RP, two sets of data, namely the pixel exposure data and the pseudo exposure data, are required to be read. In this way, a row period increases and the frame rate of the image sensor decreases.

SUMMARY

The present disclosure provides a method of removing fixed pattern noise. In the method, a fixed pattern noise which is same as that of an exposure signal is introduced when reading a reset signal, and then subtraction is performed so as to remove the fixed pattern noise in an image.

In order to achieve the above object, the present disclosure adopts the following technical solution: a method of removing fixed pattern noise, including: S01: performing a single-frame segmented exposure on a pixel array, wherein the single-frame segmented exposure includes a low-level full well capacity exposure and a high-level full well capacity exposure on a single frame, the pixel array including a pixel unit which includes a transmission MOS transistor, a photodiode, a reset MOS transistor and a floating diffusion area, and the photodiode is connected to the floating diffusion area through the transmission MOS transistor, and the floating diffusion area is further connected to the reset MOS transistor to receive a reset signal of the pixel unit;

S02: reading a signal of the pixel array, comprising: S021: performing a soft reset, so as to set the reset signal of the pixel unit to an intermediate voltage less than a power supply voltage and greater than a ground voltage, and reading a differential reset signal; S022: performing a hard reset so as to set the reset signal of the pixel unit to a high voltage greater than or equal to a sum of a power supply voltage and a threshold voltage of the reset MOS transistor; S023: turning on the transmission MOS transistor to enable an exposure signal of the photodiode to be transmitted to the floating diffusion area, and reading a differential pixel transmission signal;

S03: subtracting the differential reset signal from the differential pixel transmission signal to obtain an exposure signal with fixed pattern noise removed.

Further, when performing the hard reset in S022, the reset signal of the pixel unit is not read.

Further, in S01, the reset MOS transistor is configured to control the segmented exposure of the pixel unit.

Further, the reset MOS transistor controls the pixel unit to be subjected to the low-level full well capacity exposure first, and then to the high-level full well capacity exposure.

Further, in S01, performing the single-frame low-level full well capacity exposure for A times and B times of the single-frame high-level full well capacity exposure for B times on the pixel array, A and B are both positive integers greater than 0, respective full well charge capacities corresponding to the A times of the low-level full well capacity exposures are different from each other, and respective full well charge capacities corresponding to the B times of the high-level full well capacity exposures are different from each other.

Further, threshold voltages of the reset MOS transistors of respective pixel units of the pixel array are different from each other;

in S021, voltages across a source and a drain of the reset MOS transistors of respective pixel units are different from each other, and reset voltages of the floating diffusion areas of respective pixel units are different from each other, and the reset voltage of the floating diffusion area of the respective pixel units is negatively correlated with the threshold voltage of the respective reset MOS transistor of the respective pixel units;

in S022, the voltages across the source and the drain of the reset MOS transistor of the respective pixel units are equal, and the reset voltages of the floating diffusion areas of the respective pixel units are equal, and the reset voltages of the floating diffusion areas of the respective pixel units are equal to the power supply voltage;

the differential pixel transmission signal of the respective pixel units in S023 is negatively correlated with the threshold voltage of the reset MOS transistor of the respective pixel units.

Further, the method further includes: in S01, when collecting data of a first frame of the image sensor, the pixel array is not exposed, and an inflection point reference input module writes an inflection point reference input signal to the pixel array, the pixel array outputs a pseudo exposure signal, and writes the pseudo exposure signal to a memory, and when collecting data of a second frame and subsequent frames of the image sensor, the pixel array is exposed;

in S02, for the data of the second frame and the subsequent frames of the pixel array, a digital signal processor reading an exposure signal of the pixel unit and the pseudo exposure signal in the memory; and in S03, for data of the second frame and subsequent frames of the pixel array, subtracting the pseudo exposure data from the exposure signal of a corresponding pixel unit, so as to obtain an exposure signal with inflection point difference removed.

Further, in S02, the digital signal processor reads exposure signals of X rows of pixel units of the pixel array and corresponding pseudo exposure signals in the memory simultaneously, where X is greater than 0 and less than or equal to an amount of rows of the pixel array.

Further, in S01, the inflection point reference input signal output by the inflection point reference input module includes a high inflection point reference input signal and a low inflection point reference input signal, respectively corresponding to the pseudo exposure reset signal and the pseudo exposure output signal; and in S02, the exposure signal comprises an exposure reset signal and an exposure output signal, and the pseudo exposure signal includes a pseudo exposure reset signal and a pseudo exposure output signal.

A method of removing fixed pattern noise, comprising:

S01: collecting data of a first frame of an image sensor, wherein at this time, a pixel array is not exposed, and an inflection point reference input module writes an inflection point reference input signal into the pixel array, the pixel array outputs a pseudo exposure signal and writes the pseudo exposure signal to a memory;

S02: collecting data of a second frame of the image sensor, wherein at this time, the pixel array is exposed, and a digital signal processor reads an exposure signal of the pixel array and the pseudo exposure signal in the memory, and subtracts the pseudo exposure signal from the exposure signal of a corresponding pixel unit to obtain an exposure signal with the inflection point difference removed; and S03: repeating step S02 to collect data of a third frame to a P-th frame of the image sensor, until data of all frames is collected, wherein P indicates an amount of frames of the image sensor to be collected.

Further, in S02, the digital signal processor simultaneously reads exposure signals of X rows of pixel units of the pixel array and corresponding pseudo exposure signals in the memory, where X is an integer greater than 0 and less than or equal to an amount of rows of the pixel array.

Further, in S01, the inflection point reference input signal output by the inflection point reference input module comprises a high inflection point reference input signal and a low inflection point reference input signal, respectively corresponding to a pseudo exposure reset signal and a pseudo exposure output signal; and in S02, the exposure signal comprises an exposure reset signal and an exposure output signal, and the pseudo exposure signal comprises a pseudo exposure reset signal and a pseudo exposure output signal.

An image sensor configured to remove fixed pattern noise, includes an image sensor module, an inflection point reference input module, a memory and a digital signal processor, wherein the image sensor module comprises a pixel array comprising a plurality of pixel units, an output port of the image sensor module is connected to both the memory and the digital signal processor, the memory is connected to the digital signal processor, and an output port of the inflection point reference input module is connected to a MOS that is configured to control a segmented exposure of each pixel unit of the plurality of pixel units;

when collecting data of a first frame, the inflection point reference input module writes an inflection point reference input signal to the pixel array, the pixel array outputs a pseudo exposure signal and writes the pseudo exposure signal to the memory; starting from collecting data of a second frame, the pixel array is subjected to the segmented exposure, and the digital signal processor reads exposure signals of the pixel array and the pseudo exposure signal in the memory, and subtracts the pseudo exposure signal from the exposure signal of a corresponding pixel unit to obtain an exposure signal with inflection point difference removed;

wherein an amount of inflection point difference included in the pseudo exposure signal in the memory during writing and the reading is same as an amount of inflection point difference during exposure and reading of the pixel array.

Further, the exposure signal includes an exposure reset signal and an exposure output signal, the pseudo exposure signal includes a pseudo exposure reset signal and a pseudo exposure output signal; the inflection point reference input signal output by the inflection point reference input module includes a high inflection point reference input signal and a low inflection point reference input signal, respectively corresponding to the pseudo exposure reset signal and the pseudo exposure output signal.

Further, the segmented exposure comprises a low-level full well capacity exposure and a high-level full well capacity exposure, and the low-level full well capacity exposure and the high-level full well capacity exposure are achieved by controlling a barrier height between the photodiode of the pixel unit and the power supply.

Further, the image sensor module and the inflection point reference input module are integrated in an image sensor chip, and the memory and/or the digital signal processor are integrated outside the image sensor chip or within the image sensor chip.

Further, the digital signal processor simultaneously reads exposure signals of X rows of pixel units of the pixel array and corresponding pseudo exposure signals in the memory corresponding to the X rows of pixel units, and X is an integer greater than 0 and less than or equal to an amount of rows of the pixel array.

The embodiments of the present disclosure can produce the following beneficial effects: the present disclosure eliminates the fixed pattern noise in the image simply and effectively through introducing a difference same as that of the exposure signal into the signal reading process and performing a subtraction, and a frame rate of the image sensor is not decreased; and meanwhile, the pseudo-exposure signal is collected when the data of first frame is collected, starting from collecting data of the second frame, the exposure signal is collected, and both the pseudo-exposure signal and the exposure signal contain same inflection point differences, and the exposure signal with inflection point differences is obtained by subtracting the pseudo exposure signal from the exposure signal of a corresponding pixel unit; and processing time of each row of the image sensor can be shortened, the frame rate of the image sensor can be improved, and the FPN can be completely removed.

DETAILED DESCRIPTION

In order to make the objectives, technical solutions and advantages of the present disclosure clearer, embodiments of the present disclosure will be further described in detail below with reference to the accompanying drawings.

Figure 1:
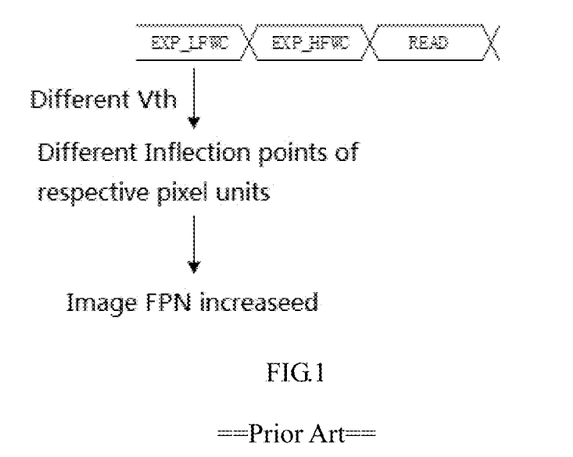
FIG. 1 shows an operation cycle of an HDR image sensor based on single-frame segmented exposure in a conventional art.
Figure 2:
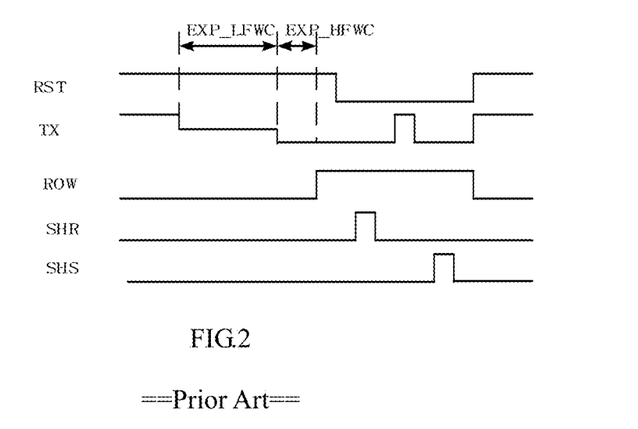
FIG. 2 shows a schematic diagram of working timing of a conventional HDR image sensor based on change in a full well capacity of a 4T pixel unit.
Figure 3:
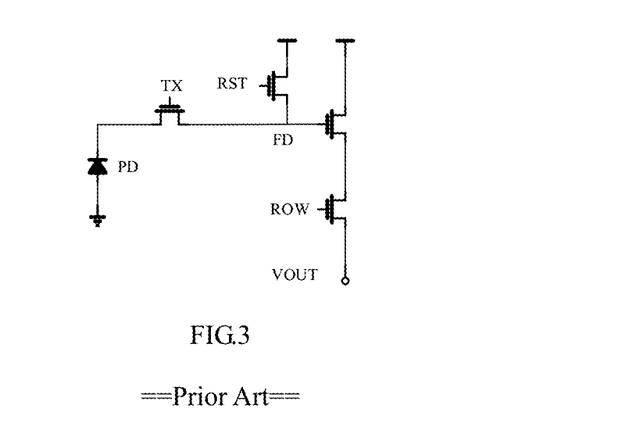
FIG. 3 illustrates a schematic diagram of a structure of a 4T pixel unit.

A method of removing fixed pattern noise according to an embodiment of the present disclosure includes the following three embodiments:

Embodiment 1: Please refer to FIGS. 1-3. FIG. 1 is a schematic diagram illustrating a working mode of a conventional HDR image sensor based on single-frame segmented exposure. In a time of one frame, the pixels are subjected to two exposures: a low-level full well capacity exposure EXP_LFWC and a high-level full well capacity exposure EXP_HFWC, after the two exposures, the exposure signal is read through two reading READ operations. The two reading operations include reading a reset signal reading and reading an exposure signal. In conventional arts, only a hard reset signal that does not contain an inflection point difference is read out, and soft rest is not performed in conventional arts, as the exposure signal contains an inflection point difference, the inflection point difference cannot be eliminated by subtracting a hard reset signal which does not have an inflection point difference from an exposure signal having an inflection point difference, which causing the final image FPN increased. In the low-level full well capacity exposure, due to difference in threshold voltages Vth of MOS transistors that control change in the full well capacity of various pixel units, the inflection points on the final signal output curves of respective pixel are different, which makes the fixed pattern noise of the final image larger. Taking the conventional 4T pixel unit in FIG. 3 as an example, in conjunction with the timing diagram in FIG. 2, it can be known that in conventional arts, the 4T pixel unit typically adopts a transmission MOS transistor TX to control a barrier height between a photodiode and a power supply of the pixel unit, so as to achieve the low-level full well capacity exposure and the high-level full well capacity exposure. Due to the different threshold voltages of the segmented exposure control transistor of each pixel, the inflection points of the pixels are different, that is, inflection point difference is formed, which increases the FPN of the image.

Figure 4:
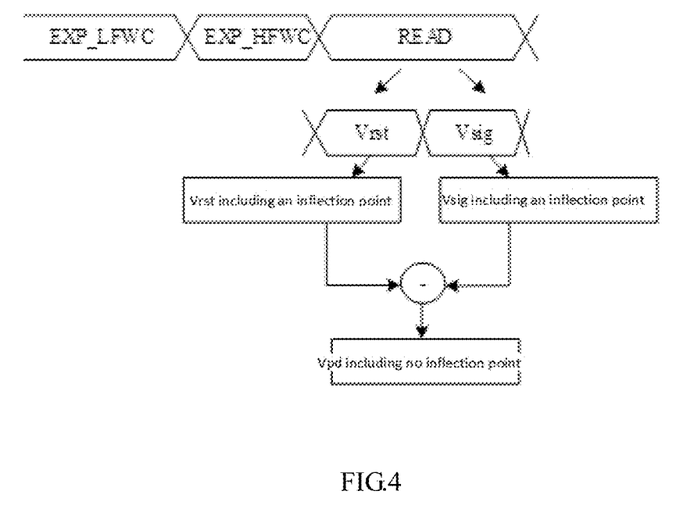
FIG. 4 is a schematic diagram illustrating a working mode of HDR FPN optimization based on differential reset according to Embodiment 1.

As illustrated in FIG. 4, this embodiment provides a method of removing fixed pattern noise based on differential reset, which includes: S01: performing a single-frame segmented exposure on a pixel array, the single-frame segmented exposure including a low-level full well capacity exposure and a high-level full well capacity exposure on a single frame; wherein the pixel array includes a pixel unit, and the pixel unit includes a transmission MOS transistor, a photodiode, a reset MOS transistor and a floating diffusion area, the photodiode is connected to the floating diffusion area through the transmission MOS transistor, and the floating diffusion area is further connected the rest MOS transistor to receive a reset signal of the pixel unit.

The method according to this embodiment is applicable to a pixel unit that is controlled by a reset MOS transistor, wherein the pixel unit is controlled by the reset MOS transistor to be subjected to a low-level full well capacity exposure EXP_LFWC and a high-level full well capacity exposure EXP_HFWC, that is, the low-level full well capacity exposure and the high-level full well capacity exposure can be achieved by adjusting the relevant timing and a voltage of the reset MOS transistor. As difference in exposure signals is caused by the reset MOS transistor, the fixed pattern noise FPN can be removed by introducing the difference of the reset MOS transistor in the soft reset of the reset. In the present disclosure, the low-level full well capacity exposure is referred to a low-level full well charge capacity exposure, and the high-level full well capacity exposure is referred to a high-level full well charge capacity exposure. All pixel units of the pixel array will be exposed to accumulate charges in the segmented exposure, and sequence of the segmented exposure must be the low-level full well capacity exposure first and then the high-level full well capacity exposure.

During the segmented exposure, a full well capacity of a pixel unit of the pixel array is related to the threshold voltages of the reset MOS transistors. Under a same control condition, the threshold voltages of reset MOS transistor of respective pixel units are different, resulting in different full well capacity of various pixel units, so the total charge amount accumulated in various pixel units in the same total exposure time are also different, that is to say, in the same exposure time, a total charge accumulated by a pixel unit is related to a threshold voltage of the reset MOS transistor, and the accumulated total charge is positively correlated with the threshold voltage of the reset MOS transistor.

In this embodiment, the segmented exposure may be a segmented exposure which includes more than two segments, and full well capacities of respective segments are different, and an amount of segments of a single-frame segmented exposure in this embodiment does not affect the method of the present embodiment. In this step, the pixel array may be subjected to the low-level full well capacity exposure for A times and the high-level full well capacity exposure for B times in a single frame, both A and B are positive integers greater than 0, and the full well capacities corresponding to the A times of low-level full well capacity exposures are different from each other, and the full well capacities corresponding to the B times of high-level full well capacity exposures are different from each other.

S02: reading READ signals of the pixel array. For example, S02 includes: S021: performing a soft reset, wherein a reset signal of the pixel unit is set to an intermediate voltage less than a power supply voltage and greater than a ground voltage, and reading a differential reset signal Vrst which includes an inflection point.

In this step, the reset signal is at the intermediate voltage, and the intermediate voltage indicates a voltage that is less than the power supply voltage and greater than the ground voltage. At this time, voltages at the source and the drain of the reset MOS transistor are not equal, and a reset voltage of the floating diffusion area connected to the reset MOS transistor is related to the threshold voltage of the reset MOS transistor of the pixel unit. Due to the process variation, the threshold voltages of the reset MOS transistors of various pixel units are different, so the reset voltages of the floating diffusion areas of various pixel units are different, and reset signals of respective pixel units read by the image sensor are also different. Moreover, the higher the threshold voltage of the reset MOS transistor is, the lower the reset voltage value of the floating diffusion area of a corresponding pixel unit is, and the lower the reset signal voltage of its corresponding pixel unit read by the image sensor is, and the reset voltage of the floating diffusion area of the pixel unit is negatively correlated with the threshold voltage of the reset MOS transistor of the pixel unit.

S022: Performing a hard reset, wherein the reset signal of the pixel unit is set to a high voltage greater than or equal to the power supply voltage. The hard reset is performed to equalize potentials of the floating diffusion areas to the power supply voltage before the pixel signal is transmitted, and the image sensor does not read the reset signal at this time.

In this step, the reset signal is a high voltage, wherein the high voltage here indicates a voltage not less than a sum of the power supply voltage connected to the reset MOS transistor and the threshold voltage of the reset MOS transistor. During hard reset, the voltages at the source and the drain of the reset MOS transistor are the same, that is, the voltage of the floating diffusion area is equal to the power supply voltage connected to the reset MOS transistor. And it can be considered that the voltages of the floating diffusion areas of all pixel units are equal to the power supply voltage at this time.

S023: Turning on the transmission MOS transistor, so that an exposure signal of the photodiode is transmitted to the floating diffusion area, and a differential pixel transmission signal Vsig is read, wherein the differential pixel transmission signal Vsig at this time includes an inflection point.

In this step, after the transmission MOS transistor between the photodiode and the floating diffusion area is turned on, charges generated by exposing the photodiode are transferred to the floating diffusion area, so that the voltage of the floating diffusion area decreases, and the decreased voltage is determined by an amount of charges generated by the photodiode during the exposure. Since the floating diffusion area is subjected to a hard reset before the exposure signal transmission, after the exposure signal transmission, the voltage of the floating diffusion area decreases, and a magnitude of the decreased voltage signal is only determined by an amount of charges generated by the exposure. For the HDR image sensor that is subjected to the segmented exposure based on the reset MOS transistor, the amount of charges generated by the exposure is related to the threshold voltage of the reset MOS transistor. Due to the process variation, the threshold voltages of the reset MOS transistors of various pixel units are different. Thus, the amounts of charges generated by various pixel units are different under the same intensity of light and in the same exposure time. The greater the threshold voltage of the reset MOS transistor, the more charges the corresponding pixel unit generates during the entire exposure, and the smaller the read voltage of the differential pixel transmission signal, that is, the differential pixel transmission signal is negatively correlated with the threshold voltage of the reset MOS transistor of a corresponding pixel unit.

S03: Subtracting the differential reset signal from the differential pixel transmission signal to obtain an exposure signal Vpf in which fixed pattern noise is removed, wherein the exposure signal Vpf at this time does not include an inflection point.

The differential pixel transmission signal read after the final pixel signal transmission contains a difference in the amount of charges generated during the exposure. Since the differential reset signal and the differential pixel transmission signal that are read in the two reading operations are negatively correlated with the threshold voltage of the reset MOS transistor, the exposure signal with the fixed pattern noise removed is obtained by subtracting the differential reset signal from the differential pixel transmission signal.

The method according to the present embodiment will be further explained hereinafter through a 4T pixel unit in conjunction with FIGS. 5-10. The method according to the present embodiment may be applicable to pixel units of all structures, and is not limited to 4T pixel units.

Figure 5:
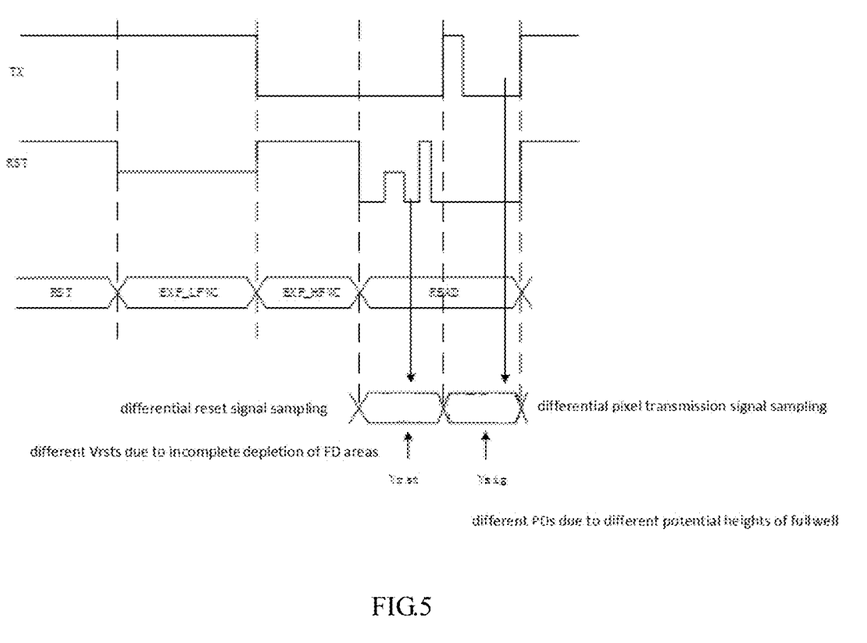
FIG. 5 is a schematic diagram illustrating the working sequence of HDR FPN optimization based on different reset of 4T pixel units according to Embodiment 1.
Figure 6:
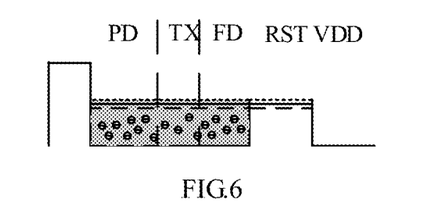
FIG. 6 is a graph illustrating change in potential barrier in a process of a low-level full well capacity exposure based on the 4T pixel unit according to Embodiment 1.

As illustrated in FIG. 5, the single-frame segmented exposure in this embodiment adopts a low-level full well capacity exposure and a high-level full well capacity exposure of conventional arts, and the exposures are the same as that of a conventional HDR image sensor based on full well capacity adjustment. As illustrated in FIGS. 5 and 6, the low-level full well capacity exposure is achieved by reducing a voltage of a reset MOS transistor RST to an intermediate voltage. During the low-level full well capacity exposure, the schematic diagram of the charge barrier of the pixel unit is illustrated in FIG. 6. Due to the different threshold voltages of the reset MOS transistors RST, full well barriers of various pixel units in the low-level full well capacity exposure are different, and a maximum amount of charges that can be stored in the photodiode PD in the exposure are different.

Figure 7:
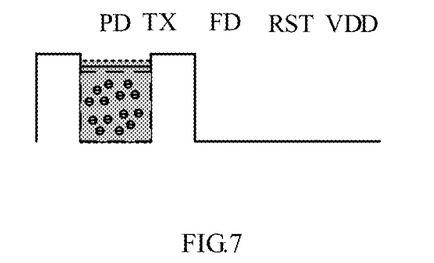
FIG. 7 is a graph illustrating change in a potential barrier in a process of a high-level full well capacity exposure based on 4T pixel units according to Embodiment 1.

As illustrated in FIGS. 5 and 7, when the pixel array enters the high-level full well capacity exposure, a gate voltage of the transmission MOS transistor TX is reduced, the transmission MOS transistor TX is turned off, and the photodiode PD continues to accumulate charges at this time, as illustrated in FIG. 7. Without taking the photo-induced noise of the pixel unit into account, charges generated by respective pixel unit are the same at this stage. However, as the amount of charges generated in various pixel units in the low-level full well capacity exposure are different, the total amount of charges at the photodiodes PD of various pixel units are different at this time.

Figure 8:
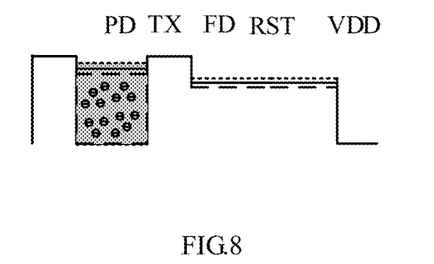
FIG. 8 is a diagram illustrating change in a potential barrier changes in a soft reset process based on a 4T pixel unit according to Embodiment 1.

As illustrated in FIG. 5, when the pixel array enters signal reading READ after the exposure, two reading operations are performed on each pixel unit: reading a differential reset signal Vrst and reading a differential pixel transmission signal Vsig. As illustrated in FIGS. 5 and 8, the differential reset signal is read during the soft reset, and a voltage of the reset MOS transistor RST is an intermediate voltage. At this time, the reset voltages of the floating diffusion areas FD of the respective pixel units are different, and potential barriers of the floating diffusion areas of the respective pixel units are different. And at this time, the differential reset signals Vrst of various pixel units are read.

Figure 9:
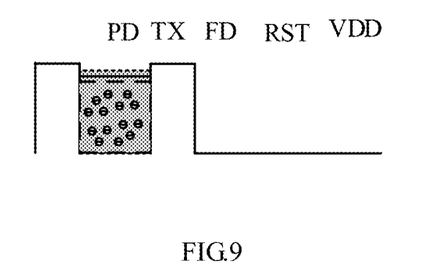
FIG. 9 is a graph illustrating change in a potential barrier in the light process of hard reset based on a 4T pixel unit according to Embodiment 1.

As illustrated in FIGS. 5 and 9, after reading the differential reset signal, the reset MOS transistor RST is pulled high, and the FD point is hard reset at this time, and the potential barriers of the floating diffusion areas FD of all pixel units in the pixel array is the same as the power supply voltage, that is, the barrier heights of the floating diffusion areas FD of all pixel units are the same at this time, as illustrated in FIG. 9. Reading is not performed at this time.

Figure 10:
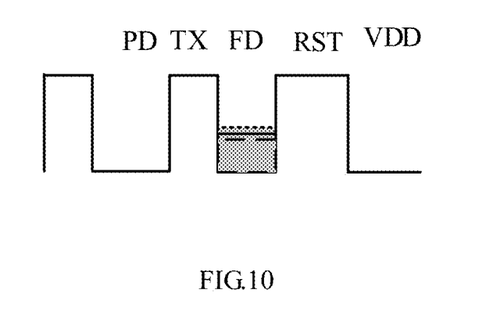
FIG. 10 is a graph illustrating change in a potential barrier during reading differential pixel transmission signals based on 4T pixel units according to Embodiment 1.

As illustrated in FIGS. 5 and 10, during reading the differential pixel transmission signals, the reset MOS transistor RST is turned off, the transmission MOS transistor TX is turned on, and the charges at the photodiode PD are all transmitted to the floating diffusion area FD. Due to the different amount of charges generated in exposure, the potential barriers of the floating diffusion areas FD are different. As illustrated in FIG. 10, the differential pixel transmission signals Vsig of various pixel units are read at this time.

Both the differential reset signal Vrst and the differential pixel transmission signal Vsig are related to the threshold voltage Vth of the reset MOS transistor RST, and the voltage V1 during the hard reset has nothing to do with the threshold voltage of the reset MOS transistor RST, VT=VDD. Without taking an amplification gain into account, Vrst=VDD−Vth, Vsig=V1−Q/C. Q indicates the total amount of charges at the PD in the exposure, and C indicates a capacitance of the floating diffusion area FD. The Q is related to the threshold voltage Vth of the reset MOS transistor RST. The greater the Vth, the greater the Q and the less the Vsig, that is, the Vsig is negatively correlated with the Vth. At the same time, the greater the Vth, the less the Vrst, that is, the Vrst is negatively correlated with the Vth. The final pixel exposure signal Vpd=Vrst−Vsig is independent of Vth.

In the present embodiment, in a complete signal reading period after one exposure, the floating diffusion area are reset for two times, two reading operations are performed. The two resets are soft reset and hard reset respectively. The differential reset signal generated by the soft reset is an effective reset signal read by the image sensor, while the hard reset is only intended to make the potentials of the floating diffusion areas of various pixel units equal to each other before the pixel signal is transmitted, and the image sensor does not read the reset signal at this time. The differential pixel transmission signal read after the final pixel signal transmission includes the difference in the amount of charges generated in the exposure. Since the differential reset signal and the differential pixel transmission signal read in the two reading operations are negatively correlated with the threshold voltage of the reset MOS transistor, an exposure signal with fixed pattern noise removed can be obtained by subtracting the differential reset signal from the differential pixel transmission signal.

Figure 14:
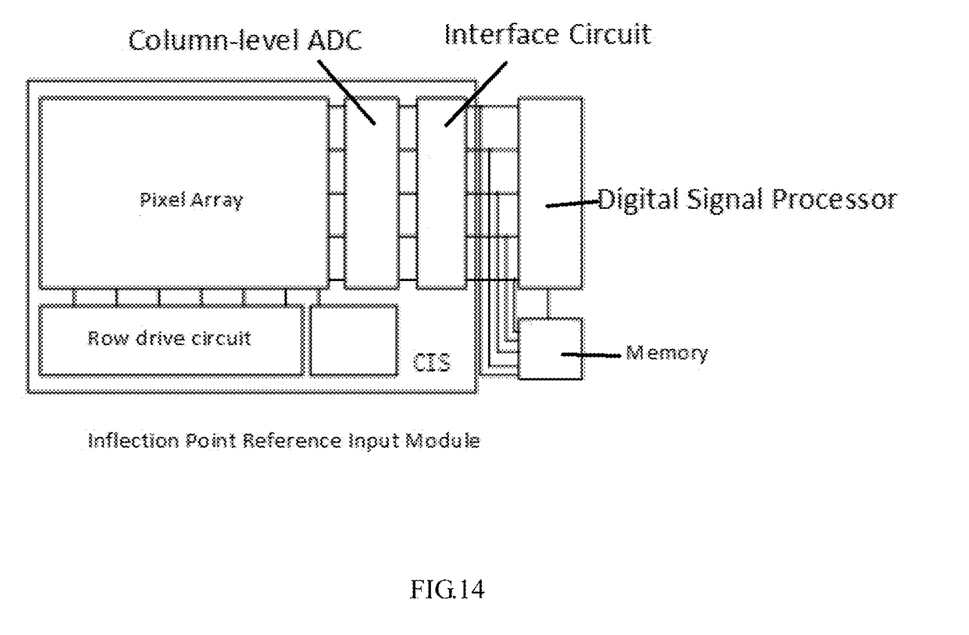
FIG. 14 is a schematic diagram illustrating an image sensor according to Embodiment 2.

Embodiment 2: As illustrated in FIG. 14, an image sensor of single-frame segmented exposure according to this embodiment includes an image sensor module, an inflection point reference input module, a memory, and a digital signal processor, wherein the image sensor module includes a pixel array having a plurality of pixel units, an output port of the image sensor module is connected to both the memory and the digital signal processor, the memory is connected to the digital signal processor, and an output port of the inflection point reference input module is connected to a MOS transistor of the pixel unit which is configured to control a segmented exposure.

The image sensor module according to the present embodiment further includes a row drive circuit, a column-level analog-digital converter (ADC), and an interface circuit. The row drive circuit is configured to generate a driving signal for each row of the pixel array. The row drive circuit is further configured to control the pixel array to be exposed row by row and to read a signal. The column-level ADC circuit is configured to convert analog signals of respective columns output from each row into digital signals and output the digital signals through the interface circuit. An output port of the interface circuit is configured as an output port of the image sensor module. The image sensor module and the inflection point reference input module are integrated in an image sensor chip, the digital signal processor may be integrated outside the image sensor chip or integrated in the image sensor chip, and the memory may be integrated in the image sensor chip or outside the image sensor.

The memory stores all pseudo-exposure signals of the pixel array, wherein the pseudo-exposure signals include an inflection point difference. The pixel array writes an inflection point difference to the memory only in collecting data of a first frame, and from a second frame, the pixel array is properly exposed, and in each frame, only the inflection point difference written in the first frame is read from the memory, and no write operation is performed to the memory any more. An end of the memory is connected to the digital signal processor, and from the second frame, values read from the memory are input to the digital signal processor for processing. The digital signal process does not perform inflection point difference removal on the first frame. From the second frame, the image sensor is properly exposed, the digital signal processor subtracts a pseudo exposure signal read from the memory from exposure signals output from an interface of the image sensor, so as to remove fixed pattern noise caused due to inflection point difference from output data of the image sensor.

The image sensor according to the present embodiment is applicable to a single-frame segmented exposure. The operation principle of single-frame segmented exposure is that a voltage of the MOS transistor that controls exposures is not a maximum voltage (with respect to the ground voltage and a power supply voltage) in a low-level full well capacity exposure. The voltage in the low-level full well capacity exposure is defined as an intermediate voltage, so that charges higher than a barrier height corresponding to the intermediate voltage is discharged, which is indicated as a broken line with an inflection point on a sensitivity curve. Below the intermediate voltage, due to difference in the thresholds of the MOS transistors that control exposure of respective pixel units, the barrier heights formed in respective pixel units at the intermediate voltage are different, resulting in different residual charges and different inflection points for respective pixel units. That is, the inflection point is caused due to the intermediate voltage. Therefore, in reading the pseudo-exposure signal, in order to ensure that the read pseudo-exposure signal includes an inflection point difference, a corresponding MOS transistor configured to control exposure should be kept at the intermediate voltage when reading the pseudo-exposure signal. Since the inflection point difference of the pixel units is determined by the threshold of the MOS transistor which is configured to control the segmented exposure, and the threshold of the device on the chip has nothing to do with time, it can be considered that the inflection point differences of respective pixel units in the first frame and in subsequent frames following the first frame are the same. Thus, the inflection point difference can be removed by subtracting the inflection point difference in the first frame from the subsequent frames. The inflection point difference in the present embodiment refers to difference in the value of the inflection point in the output signal of the pixel array deviating from the normal inflection point value due to the different thresholds of the MOS transistors of respective pixel units configured to control the segment exposure.

The inflection point reference input signal output by the inflection point reference input module is required to pass through the MOS transistor generating the inflection point difference, that is, the MOS transistor that controls the segmented exposure of the pixel unit; in this way, it can be guaranteed that the inflection point difference can be removed by subtracting the pseudo exposure signal from the exposure signal and an amount of inflection point differences during that the inflection point reference input signal writes to or reads from the memory is required be equal to an amount of inflection point differences generated during the exposure and the reading of the pixel signals. If there is one inflection point difference generated in the exposure of the pixel array, there should be only one operation which generates an inflection point in an entire process of writing/reading the inflection point reference input signal into/from the memory. If there are two inflection point differences generated in the exposure of the pixel array, there should be two inflection point differences in the entire process of writing/reading the inflection point reference input signal into/from the memory. Thus, fixed pattern noise due to inflection point difference can be removed to the greatest extent. If there are two inflection point difference in the exposure of the pixel array and there is one operation which generates an inflection point in the entire process of writing/reading the inflection point reference input signal into/from the memory, the fixed pattern noise due to the inflection point difference cannot be removed completely. In this embodiment, there may be one or more MOS transistors which are configured to control the segmented exposure. When there are more than one MOS transistors which are configured to control the segmented exposure, a respective inflection point reference input module is connected to the more than one MOS transistors which are configured to control segmented exposure so as to ensure that all inflection points in the finally generated image are removed.

In this embodiment, the output port of the inflection point reference input module is connected to the MOS transistor of the pixel unit which is configured to control the segmented exposure, thus, it is ensured that the inflection point reference input signal is written through the MOS transistor which generates the inflection point difference. For example, the inflection point reference input module is connected to each pixel unit or a column of pixel units or one pixel unit of the pixel array, which depends on an exposure mode of the pixel array and an output mode of the pixel array. If the pixel array is exposed globally, all the pixel units of the pixel array are connected to one inflection point reference input module, that is, only one inflection point reference input module is required for the entire image sensor; if the pixel array is exposed row by row, each row of the pixel units is connected to an inflection point reference input module, that is, an amount of inflection point reference input modules of the entire image sensor is the same as an amount of rows of the pixel units of the image sensor; and if the plurality of pixel units of the pixel array are exposed individually, each pixel unit is required to be connected to an inflection point reference input modules, that is, an amount of inflection point reference input modules of the entire image sensor is equal an amount of pixel units of the image sensor.

In this embodiment, the principle of removing the inflection point difference of the image sensor is as follows: during collecting data of a first frame, the inflection point reference input module inputs an inflection point reference input signal to the pixel array, the pixel array outputs a pseudo exposure signal, and writes the pseudo exposure signal to the memory; from collecting a second frame data, the segmented exposure is performed on the pixel array, the digital signal processor reads an exposure signal of the pixel array and the pseudo exposure signal in the memory, and subtracts the pseudo exposure signal from the exposure signal of the corresponding pixel unit, so as to obtain an exposure signal with the inflection point difference removed; wherein an amount of inflection point differences in the pseudo exposure signal during the writing and the reading is same as an amount of inflection point differences during exposure and reading of the pixel array. During the whole working process of the chip, the inflection point reference input signal is required to be written only in collecting the first frame data, and then the frames are exposed normally, and the inflection point reference input signal is not written any more; and similarly, the pseudo exposure data is required to be written to the memory in the first frame only, and it is required to only read the pseudo exposure data from the memory in subsequent frames.

Figure 15:
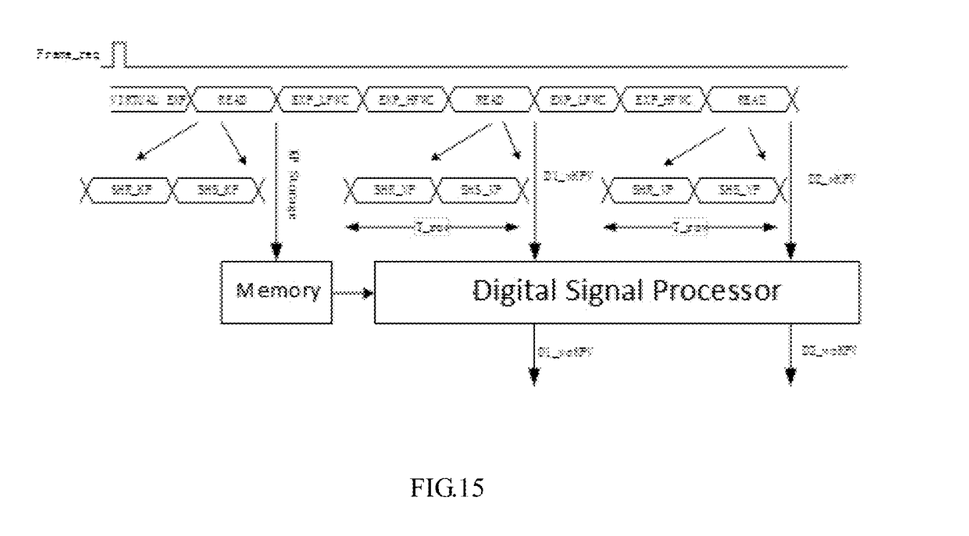
FIG. 15 is a schematic diagram illustrating a working process of the image sensor according to Embodiment 2.

Referring to FIG. 15, the method of removing an inflection point is described by taking a correlated double sampling process as an example. The method of removing the inflection point according to this embodiment is also applicable to other sampling methods. As can be seen from FIG. 15, a pseudo exposure signal and an inflection point difference are read only in a first frame. From a second frame, a pixel unit has only 3 working states: low-level full well capacity exposure EXP_LFWC, high-level full well capacity exposure EXP_HFWC, reading READ, and there are only two working states in the reading: reading a pixel reset signal SHR_VP and reading a pixel output signal SHS_VP. A pseudo-exposure of the first frame is same as that is illustrated in FIG. 13. The inflection point reference input module writes a high inflection point reference input signal and a low inflection point reference input signal in two writing operations respectively to simulate the exposure of the pixel unit. There are two working states in reading corresponding to the pseudo exposure: reading an inflection point reset signal SHR_KP and reading an inflection point output signal SHS_KP.

The plurality of pixel units are not exposed in the first frame, that is, a pseudo exposure and an exposure of a pixel unit are not performed in a single frame, while a pseudo exposure and an exposure of a pixel unit are performed in a single frame in conventional arts. From a second frame, an exposure of a pixel unit includes a low-level full well capacity exposure and a high-level full well capacity exposure. By controlling a barrier height between a photodiode of the pixel unit and a power supply voltage, conversion between a low-level full well capacity and a high-level full well capacity is achieved. Each pixel will be subjected to these two exposures, but for large signals, effective exposure time may be less than a sum of a time of the low-level full well capacity exposure and a time of the high-level full well capacity exposure, because signals are easy to be saturated in the low-level full well capacity exposure and charges generated in excessive exposure time after saturation are absorbed by the power supply and are not accumulated by the pixel unit any more.

Processing of reading of the first frame is also different from processing of reading of subsequent frames. After reading the pseudo exposure reset signal and the pseudo-exposure output signal of the first frame, a pseudo exposure signal including the inflection point difference of each pixel unit can be obtained. First, the pseudo exposure signal is written to each pixel unit, and then the pseudo exposure signal is read, and the read pseudo exposure signal is written to the memory. In reading of subsequent frames starting from a second frame, an exposure signal of each pixel unit is obtained by reading an exposure reset signal and an exposure output signal of each pixel unit, wherein the exposure signal includes an inflection point difference. The obtained exposure signal is output to a digital signal processor, and at the same time, the digital signal processor reads a pseudo exposure signal of a corresponding pixel unit from the memory, and subtracts the pseudo exposure signal from the exposure signal of the corresponding pixel unit so as to obtain an exposure signal with inflection point difference removed.

A method of collecting data through an image sensor based on single-frame segmented exposure according to this embodiment includes the following steps: S01: collecting data of a first frame of the image sensor, wherein, in the first frame, the pixel array is not exposed, an inflection point reference input module writes an inflection point difference reference input signal to a pixel array, the pixel array outputs a pseudo exposure signal and writes the pseudo exposure signal to a memory.

S02: Collecting data of a second frame data of the image sensor, wherein in the second frame, the pixel array is exposed, a digital signal processor reads an exposure signal of the pixel array and the pseudo exposure signal from the memory, and subtracts the pseudo exposure signal from the exposure signal of a corresponding pixel unit so as to obtain an exposure signal with inflection point difference removed.

The digital signal processor simultaneously reads exposure signals of X rows of pixel units of the pixel array and corresponding pseudo exposure signals in the memory, where X is an integer greater than 0 and less than or equal to an amount of rows of pixel units of the pixel array. That is to say, the digital signal processor reads exposure signals of a row and subtracts the pseudo exposure signals from the exposure signals, and at the same time, the digital signal processor reads exposure signals of another row, thereby improving the frame rate. At the same time, if the digital signal processor reads the pseudo exposure signals of a row and subtracts the pseudo exposure signals from the exposure signal independently, that is, processing row by row, it also falls within the protection scope of the present disclosure.

S03: Repeating step S02 to collect data of the third frame to the P-th frame of the image sensor until data of all frames is collected, wherein P indicates an amount of frames collected by the image sensor.

The structure and method of removing inflection point difference according to this embodiment only requires to ensure that the output port of the inflection point reference input module is connected to the MOS transistor of the pixel unit that is configured to control the segmented exposure, and an amount of inflection point differences of the pseudo exposure signal in reading and writing equal to an amount of inflection point differences of the exposure signals of the pixel array in exposure and outputting. Based on this, it can be applicable to image sensors of any structure. The following describes the image sensor by taking 5 Ts structure as an example.

Figure 16:
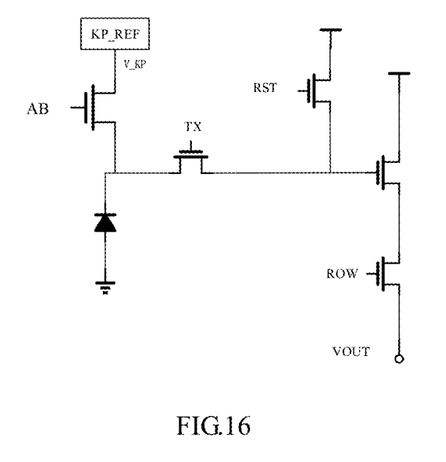
FIG. 16 illustrates a schematic structural diagram based on an inflection point reference input module and a 5T pixel unit according to Embodiment 2.

FIG. 16 is a schematic diagram illustrating a connection between the 5T-based inflection point reference input module and the pixel unit. A HDR of 5T is achieved by adjusting a gate voltage of a transistor AB. In proper exposure, an inflection point reference input module outputs a power supply voltage all the time, and the pixel unit works properly. In pseudo exposure, the inflection point reference input module outputs a high inflection point reference input signal and a low inflection point reference input signal respectively.

Figure 17:
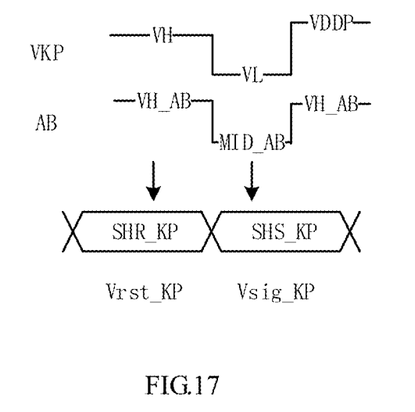
FIG. 17 is a schematic diagram illustrating a working process of pseudo exposure based on a 5T pixel unit according to Embodiment 2.

In conjunction with FIG. 16 in combination with FIG. 17, pseudo-exposure and reading of the pseudo-exposure signal according to the present disclosure is described. Mark an output signal of the inflection point input module as VKP, a high inflection point reference input signal of VKP as VH, a low inflection potion reference input signal as VL, a power supply voltage for a pixel unit as VDDP, a high level of a gate of a transistor AB as VH_AB, a intermediate level of the gate of the transistor AB as MID_AB, and a low level of the gate of the transistor AB as VL_AB, where MID_AB is a voltage of the gate of the transistor AB in the low-level full well capacity exposure in proper exposure. When the inflection point input module outputs VH, the voltage of the gate of the transistor AB is VH_AB, at this time the transistor AB is completely turned on, a voltage at PD is VPD1=VH, and the PD signal collected at this time is the pseudo exposure reset signal Vrst_KP; when the inflection point input module outputs VL, the voltage of the gate of the transistor AB is MID_AB. At this time, the transistor AB is not completely turned on. The voltage at the PD is VPD2=VL−Vth, and Vth is a threshold of the transistor AB. The PD signal collected at this time is the pseudo exposure output signal Vsig_KP. After the pseudo exposure data is collected, the inflection point input module outputs the power supply voltage VDDP, the voltage of the gate of the transistor AB is pulled up to VH_AB, and the PD enters a reset state to prepare for next exposure. A signal obtained by the pseudo exposure is V_KP=VH−(VL−Vth)=VH−VL+Vth. It can be seen that V_KP is positively correlated with Vth.

For the proper exposure, mark the collected exposure reset signal as Vrst_PD, and the collected exposure output signal as Vsig_PD. When the voltage of the gate of the transistor AB is MID_AB, the barrier height is related to (MID_AB−Vth). The less the Vth of the transistor AB, the greater the (MID_AB−Vth), the less the barrier height, the less the accumulated charges, and the greater the obtained Vsig_PD; and on the contrary, the greater the Vth of the transistor AB, the less the (MID_AB−Vth), the greater the barrier height, the more the accumulated charges and the less the obtained Vsig_PD. It can be seen that Vsig_PD is negatively correlated with Vth. The obtained exposure signal V_PD=Vsig_PD−Vrst_PD is positively correlated with Vth, so (V_PD−V_KP) is independent of Vth, that is, the image fixed pattern noise finally formed by the inflection point difference due to the Vth difference is optimized.

Embodiment 3: Both the methods according to Embodiment 1 and Embodiment 2 are adopted to remove fixed pattern noise at the same time, and the details are as follows: a method of removing fixed pattern noise, including: S01: Performing single-frame segmented exposure on a pixel array, and the single-frame segmented exposure includes a low-level full well capacity exposure and a high-level full well capacity exposure on a single frame respectively; the pixel array includes a pixel unit, and the pixel unit includes a transmission MOS transistor, a photodiode, a reset MOS transistor and a floating diffusion area, and the photodiode is connected to the floating diffusion area through the transmission MOS transistor, and the floating diffusion area is further connected to the reset MOS transistor to receive a reset signal. Detailed operation is as described in Embodiment 1.

In single-frame segmented exposure of the pixel array, when collecting data of a first frame of the image sensor, the pixel array is not exposed, and an inflection point reference input module writes an inflection point reference input signal to the pixel array, and the pixel array outputs a pseudo exposure signal, and writes the pseudo exposure signal to a memory; when collecting data of a second frame and subsequent frames of the image sensor, the pixel array is exposed.

S02: reading signals of the pixel array, including: S021: performing a soft reset: set a reset signal of the pixel unit to an intermediate voltage less than a power supply voltage and greater than a ground voltage, and reading a differential reset signal; S022: performing a hard reset: set the reset signal of the pixel unit to a high voltage greater than or equal to a sum of the power supply voltage and a threshold voltage of the reset MOS transistor; S023: turning on the transmission MOS transistor, so that exposure signal of the photodiode is transmitted to the floating diffusion area, and reading a differential pixel transmission signal;

wherein, in reading the signal of the pixel array, for data of a second frame and subsequent frames of the pixel array, the digital signal processor reads the exposure signal of the pixel array and the pseudo exposure signal in the memory;

S03: subtracting the differential reset signal from the differential pixel transmission signal so as to obtain an exposure signal with fixed pattern noise removed;

Wherein, for the data of the second frame and subsequent frames of the pixel array, the pseudo exposure signal is subtracted from the exposure signal of a corresponding pixel unit so as to obtain an exposure signal with inflection point difference removed.

Detailed operations in the above steps may be referred to the contents of Embodiment 1 and Embodiment 2, and the description will not be elaborated here.

Finally, it should be noted that the above embodiments are only intended to illustrate the present disclosure, and are not intended to limit the implementation scope of the present disclosure. That is, all equivalent changes and modifications made according to the content of the patented scope of the present disclosure shall fall within the technical scope of the present disclosure.

What is claimed is:

1. A method of removing fixed pattern noise, comprising: S01: performing a single-frame segmented exposure on a pixel array, wherein the single-frame segmented exposure comprises a low-level full well capacity exposure and a high-level full well capacity exposure on a single frame respectively, the pixel array comprises a pixel unit, the pixel unit comprises a transmission MOS transistor, a photodiode, a reset MOS transistor and a floating diffusion area, the photodiode is connected to the floating diffusion area through the transmission MOS transistor, and the floating diffusion area is further connected to the reset MOS transistor to receive a reset signal; S02: reading a signal of the pixel array, comprising: S021: performing a soft reset, so as to set the reset signal of the pixel unit to an intermediate voltage less than a power supply voltage and greater than a ground voltage, and reading a differential reset signal; S022: performing a hard reset so as to set the reset signal of the pixel unit to a high voltage greater than or equal to a sum of a power supply voltage and a threshold voltage of the reset MOS transistor; S023: turning on the transmission MOS transistor to enable an exposure signal of the photodiode to be transmitted to the floating diffusion area, and reading a differential pixel transmission signal; S03: subtracting the differential reset signal from the differential pixel transmission signal to obtain an exposure signal with fixed pattern noise removed.

2. The method according to claim 1, wherein when performing the hard reset in S022, the reset signal of the pixel unit is not read.

3. The method according to claim 1, wherein in S01, the reset MOS transistor is configured to control the segmented exposure of the pixel unit.

4. The method according to claim 3, wherein the reset MOS transistor controls the pixel unit to be subjected to the low-level full well capacity exposure first, and then to the high-level full well capacity exposure.

5. The method according to claim 3, further comprising, in S01, performing the single-frame low-level full well capacity exposure for A times and B times of the single-frame high-level full well capacity exposure for B times on the pixel array, A and B are both positive integers greater than 0, respective full well charge capacities corresponding to the A times of the low-level full well capacity exposures are different from each other, and respective full well charge capacities corresponding to the B times of the high-level full well capacity exposures are different from each other.

6. The method according to claim 3, wherein threshold voltages of the reset MOS transistors of respective pixel units of the pixel array are different from each other; in S021, voltages across a source and a drain of the reset MOS transistors of respective pixel units are different from each other, and reset voltages of the floating diffusion areas of respective pixel units are different from each other, and the reset voltage of the floating diffusion area of respective the pixel units is negatively correlated with the threshold voltage of the reset MOS transistor of the respective pixel units; in S022, the voltages across the source and the drain of the reset MOS transistor of the respective pixel units are equal, and the reset voltages of the floating diffusion areas of the respective pixel units are equal, and the reset voltages of the floating diffusion areas of the respective pixel units are equal to the power supply voltage; the differential pixel transmission signal of the respective pixel units in S023 is negatively correlated with the threshold voltage of the reset MOS transistor of the respective pixel units.

7. The method according to claim 1, comprising: in S01, when collecting data of a first frame of the image sensor, the pixel array is not exposed, and an inflection point reference input module writes an inflection point reference input signal to the pixel array, the pixel array outputs a pseudo exposure signal, and writes the pseudo exposure signal to a memory, and when collecting data of a second frame and subsequent frames of the image sensor, the pixel array is exposed; in S02, for the data of the second frame and the subsequent frames of the pixel array, the digital signal processor reading an exposure signal of the pixel unit and the pseudo exposure signal in the memory; and in S03, for data of the second frame and subsequent frames of the pixel array, subtracting the pseudo exposure data from the exposure signal of a corresponding pixel unit, so as to obtain an exposure signal with inflection point difference removed.

8. The method according to claim 7, wherein in S02, the digital signal processor reads exposure signals of X rows of pixel units of the pixel array and corresponding pseudo exposure signals in the memory simultaneously, where X is greater than 0 and less than or equal to an amount of rows of the pixel array.

9. The method according to claim 7, wherein in S01, the inflection point reference input signal output by the inflection point reference input module comprises a high inflection point reference input signal and a low inflection point reference input signal, respectively corresponding to the pseudo exposure reset signal and the pseudo exposure output signal; and in S02, the exposure signal comprises an exposure reset signal and an exposure output signal, and the pseudo exposure signal comprises a pseudo exposure reset signal and a pseudo exposure output signal.

10. A method of removing fixed pattern noise, comprising: S01: collecting data of a first frame of an image sensor, wherein at this time, a pixel array is not exposed, and an inflection point reference input module writes an inflection point reference input signal into the pixel array, the pixel array outputs a pseudo exposure signal and writes the pseudo exposure signal to a memory; S02: collecting data of a second frame of the image sensor, wherein at this time, the pixel array is exposed, and a digital signal processor reads out an exposure signal of the pixel array and the pseudo exposure signal in the memory, and subtracts the pseudo exposure signal from the exposure signal of a corresponding pixel unit to obtain an exposure signal with the inflection point difference removed; S03: repeating step S02 to collect data of a third frame to a P-th frame of the image sensor, until data of all frames is collected, wherein P indicates an amount of frames of the image sensor to be collected.

11. The method according to claim 10, wherein, in S02, the digital signal processor simultaneously reads exposure signals of X rows of pixel units of the pixel array and corresponding pseudo exposure signals in the memory, where X is an integer greater than 0 and less than or equal to an amount of rows of pixel units of the pixel array.

12. The method according to claim 10, wherein, in S01, the inflection point reference input signal output by the inflection point reference input module comprises a high inflection point reference input signal and a low inflection point reference input signal, respectively corresponding to a pseudo exposure reset signal and a pseudo exposure output signal; and in S02, the exposure signal comprises an exposure reset signal and an exposure output signal, and the pseudo exposure signal comprises the pseudo exposure reset signal and the pseudo exposure output signal.

13. An image sensor configured to remove fixed pattern noise, comprising an image sensor module, an inflection point reference input module, a memory and a digital signal processor, wherein the image sensor module comprises a pixel array comprising a plurality of pixel units, an output port of the image sensor module is connected to both the memory and the digital signal processor, the memory is connected to the digital signal processor, and an output port of the inflection point reference input module is connected to a MOS that is configured to control a segmented exposure of the pixel unit, when collecting data of a first frame, the inflection point reference input module writes an inflection point reference input signal to the pixel array, the pixel array outputs a pseudo exposure signal and writes the pseudo exposure signal to the memory; starting from collecting data of a second frame, the pixel array is subjected to the segmented exposure, and the digital signal processor reads exposure signals of the pixel array and the pseudo exposure signal in the memory, and subtracts the pseudo exposure signal from the exposure signal of a corresponding pixel unit to obtain an exposure signal with inflection point difference removed;

wherein an amount of inflection point difference included in the pseudo exposure signal in the memory during writing and reading is same as an amount of inflection point difference during exposure and reading of the pixel array.

14. The image sensor according to claim 13, wherein the exposure signal includes an exposure reset signal and an exposure output signal, the pseudo exposure signal includes a pseudo exposure reset signal and a pseudo exposure output signal; the inflection point reference input signal output by the inflection point reference input module includes a high inflection point reference input signal and a low inflection point reference input signal, respectively corresponding to the pseudo exposure reset signal and the pseudo exposure output signal.

15. The image sensor according to claim 13, wherein the segmented exposure comprises a low-level full well capacity exposure and a high-level full well capacity exposure, and the low-level full well capacity exposure and the high-level full well capacity exposure are achieved by controlling a barrier height between the photodiode of the pixel unit and the power supply.

16. The image sensor according to claim 13, wherein the image sensor module and the inflection point reference input module are integrated in an image sensor chip, and the memory and/or the digital signal processor are integrated outside the image sensor chip or within the image sensor chip.

17. The image sensor according to claim 13, wherein the digital signal processor simultaneously reads exposure signals of X rows of pixel units of the pixel array and corresponding pseudo exposure signals in the memory corresponding to the X rows of pixel units, and X is an integer greater than 0 and less than or equal to an amount of rows of pixel units of the pixel array.

* * * * *